United States Patent
Shih et al.

(10) Patent No.: US 8,854,473 B2
(45) Date of Patent: Oct. 7, 2014

(54) REMOTE TRACKING SYSTEM AND METHOD FOR IMAGE OBJECT REGION USING IMAGE-BACKWARD SEARCH

(75) Inventors: Ming-Yu Shih, Taoyuan (TW); I-Wei Wu, Hsinchu (TW); Sung-Fei Yang, Hsinchu (TW); Chin-Chung Nien, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 345 days.

(21) Appl. No.: 13/025,326

(22) Filed: Feb. 11, 2011

(65) Prior Publication Data

US 2012/0133778 A1 May 31, 2012

(30) Foreign Application Priority Data

Nov. 30, 2010 (TW) .............................. 99141563 A

(51) Int. Cl.
- *G06K 17/00* (2006.01)
- *H04N 7/18* (2006.01)
- *G06T 7/20* (2006.01)

(52) U.S. Cl.
CPC ...... *H04N 7/185* (2013.01); *G06T 2207/30184* (2013.01); *G06T 2207/10032* (2013.01); *G06T 7/204* (2013.01); *G06T 2207/20104* (2013.01)
USPC ........................................................ 348/169

(58) Field of Classification Search
CPC ................... H04N 7/185; G06T 7/204; G06T 2207/30184; G06T 2207/20104; G06T 2207/10032
USPC ........................................................ 348/169
See application file for complete search history.

(56) References Cited

U.S. PATENT DOCUMENTS

| | | | | |
|---|---|---|---|---|
| 3,908,082 | A | * | 9/1975 | Pownall ........................ 348/262 |
| 5,689,301 | A | * | 11/1997 | Christopher et al. ........... 348/97 |
| 5,796,444 | A | * | 8/1998 | Inamori ........................ 348/525 |
| 5,917,958 | A | * | 6/1999 | Nunally et al. ............... 382/276 |

(Continued)

FOREIGN PATENT DOCUMENTS

| | | |
|---|---|---|
| EP | 691767 A2 * | 1/1996 |
| JP | 2006-014121 | 1/2006 |
| WO | 2006/138544 A1 | 12/2006 |
| WO | 2008/154742 A1 | 12/2008 |

OTHER PUBLICATIONS

China Patent Office, Office Action, Patent Application Serial No. CN201010597473.6, Mar. 11, 2013, China.

(Continued)

*Primary Examiner* — Richard Torrente
*Assistant Examiner* — Joseph Suh
(74) *Attorney, Agent, or Firm* — Rabin & Berdo, P.C.

(57) ABSTRACT

In one exemplary embodiment, an object region tracking and picturing module is constructed on a moving platform of a mobile end and a remote control module is constructed on another platform for an image object region tracking system. The two modules communicate with each other via a digital network for delivering required information. The object region tracking and picturing module uses a real-time image backward search technology to store at least an image frame previously captured on the moving platform into a frame buffer, and start tracking an object region from the position pointed out by the remote control module to a newest image frame captured on the moving platform, then find out a relative position on the newest image frame for the tracked object region.

4 Claims, 12 Drawing Sheets

(56) References Cited

U.S. PATENT DOCUMENTS

| | | | |
|---|---|---|---|
| 5,999,905 A * | 12/1999 | Isozaki | 704/500 |
| 6,002,385 A * | 12/1999 | Silverbrook | 345/100 |
| 6,275,818 B1 * | 8/2001 | Subramanian et al. | |
| 6,321,024 B1 * | 11/2001 | Fujita et al. | 386/281 |
| 6,359,647 B1 * | 3/2002 | Sengupta et al. | 348/154 |
| 6,360,273 B1 * | 3/2002 | Beurket et al. | 709/244 |
| 6,650,333 B1 * | 11/2003 | Baldwin | 345/552 |
| 7,184,574 B1 * | 2/2007 | Zahavi | 382/103 |
| 7,684,592 B2 * | 3/2010 | Paul et al. | 382/103 |
| 7,756,296 B2 * | 7/2010 | Porikli et al. | 382/103 |
| 8,395,629 B1 * | 3/2013 | Kilpatrick et al. | 345/522 |
| 2002/0105578 A1 * | 8/2002 | Hunter | 348/169 |
| 2002/0188945 A1 * | 12/2002 | McGee et al. | 725/39 |
| 2003/0069065 A1 * | 4/2003 | Natsuyama | 463/20 |
| 2005/0104890 A1 * | 5/2005 | Champion | 345/531 |
| 2005/0180504 A1 * | 8/2005 | Yamada et al. | 375/240.12 |
| 2005/0185923 A1 * | 8/2005 | Tsurui et al. | 386/68 |
| 2006/0092165 A1 * | 5/2006 | Abdalla et al. | 345/545 |
| 2006/0291731 A1 * | 12/2006 | Schoisswohl | 382/238 |
| 2007/0070201 A1 * | 3/2007 | Yokomitsu et al. | 348/169 |
| 2007/0188653 A1 * | 8/2007 | Pollock et al. | 348/373 |
| 2008/0028181 A1 * | 1/2008 | Tong et al. | 711/207 |
| 2008/0278584 A1 * | 11/2008 | Shih et al. | 348/169 |
| 2009/0189974 A1 * | 7/2009 | Deering | 348/46 |
| 2009/0196188 A1 * | 8/2009 | Takeyoshi et al. | 370/242 |
| 2010/0045783 A1 * | 2/2010 | State et al. | 348/53 |
| 2010/0124358 A1 * | 5/2010 | Huang et al. | 382/103 |
| 2010/0265260 A1 * | 10/2010 | Swic et al. | 345/539 |
| 2011/0116502 A1 * | 5/2011 | Hamai | 370/389 |
| 2011/0295851 A1 * | 12/2011 | El-Saban et al. | 707/728 |

OTHER PUBLICATIONS

Taiwan Patent Office, Office Action, Patent Application Serial No. TW099141563, Jul. 30, 2013, Taiwan.

* cited by examiner

REMOTE TRACKING SYSTEM AND METHOD FOR IMAGE OBJECT REGION USING IMAGE-BACKWARD SEARCH

TECHNICAL FIELD

The present disclosure generally relates to a tracking system and method for image object region and computer program product thereof.

BACKGROUND

When natural disaster occurs, ground traffic and communication are usually interrupted. The rescue command center usually needs real-time information on the damaged areas. FIG. 1 shows an exemplary schematic view of a mobile large-area rescue information real-time collection system. As shown in FIG. 1, the system uses unmanned aerial vehicle (UAV) or other mobile devices (called mobile end 110) for capturing and transmitting images, in combination with real-time video streaming module and real-time selection zoom-in picture fast report module 120, to obtain the zoom-in images of specific object regions so that the rescue command center, such as, via central control system 140, at the backend, such as ground control station 130, may rapidly obtain the image information of the damaged area in real-time to learn the latest development 150 of the damaged area. Real-time video streaming module and real-time selection zoom-in picture fast report module are the devices at mobile end 110. For example, real-time video streaming module may be a wide-angle camera to capture the real-time large-area image of the damaged area, while real-time selection zoom-in picture fast report module may be a Pan/Tilt/Zoom (PTZ) camera to obtain the zoom-in pictures of a selected object region.

In other words, the mobile large-area rescue information real-time collection system mainly includes a mobile end and a ground control end. The mobile end is the core of the system, and is responsible for capturing and transmitting images. The ground control end is an operation interface, and is for the ground operator to select the object region based on the current captured large-area image and to display the zoom-in picture for the selected object region. In the mobile large area rescue information real-time collection system, the real-time selection zoom-in picture fast report module is for obtaining the zoom-in picture of the object region so that the rescue command center may accurately know the latest development in the area.

Because of the delay of the image codec and network transmission between the mobile end and the backend control end, the video streaming seen at the backend control end will lag behind the image currently captured by the mobile end. FIG. 2 shows an exemplary schematic view of discrepancy between the mobile end and the ground control station. As shown in FIG. 2, an offset 262 exists between object region 230 (x,y) selected by the operator at the ground control end at time i+n and location 260 of the object region in the captured image 240 by mobile end at a current time (e.g., i+2n). Hence, for the operator to correctly select the object region, the system must accurately calculate offset 262, and determine the related location of the object region selected at the ground control end in the captured image at the mobile end according to offset 262.

In a conventional technique, FIG. 3 shows an exemplary conventional real-time object tracking system. Object tracking system 300 inputs a plurality of video images 305 to buffer 310, and selects a tracking module 320 from a plurality of tracking modules to track forward 330 and track backward 340 the video images in the buffer. After track forward and track backward, a tracking error 350 is obtained. When tracking error 350 is less than a threshold 360, the buffer is emptied (as marked 370) for subsequent tracking. Otherwise, when tracking error is larger than the threshold 360, another tracking module is selected (as marked 380) to perform tracking.

Another technique to track delayed images is shown in FIG. 4. An object tracking system 400 for tracking objects pictured remotely is shown. When the operator selects the object from the image at control station 410, control tracker 412 uses the past images stored at control station 410 to start tracking. Based on the tracking result, control tracker 412 generates control movement instructions to indicate the movement direction of the tracked object, and transmits the instruction to the sensor unit 420. Based on the received instruction, sensor unit 420 drives remote tracker 422 to adjust the location of image sensor 424 to capture the tracked object.

The contemporary UAV object tracking technique usually requires expensive measuring equipment, such as high precision GPS and an attitude director indicator (ADI), and complicated calculations to estimate the current relative height between the mobile end and the object region, velocity and direction to accurately calculate the offset. The inclusion of the above equipment indicates a cost, volume, weight and fuel-consumption at the mobile end also increase. Therefore, the object tracking mechanism needs to solve the problems of efficiency, including, cost, accuracy, and delay caused by the network transmission leading to asynchronous images.

SUMMARY

The exemplary embodiments provide a tracking system and method for image object region and computer program product thereof.

An exemplary embodiment relates to a tracking system for image object region. The system comprises an object region tracking and picturing module and a remote control module. The object region tracking and picturing module is constructed on a moving platform of a mobile end and the remote control module is constructed on another platform for an image object region tracking system. The two modules communicate with each other via a digital network for delivering required information. The object region tracking and picturing module uses a technology of real-time image backward search to store at least an image frame previously captured on the moving platform into a frame buffer, and start tracking an object region from the position pointed out by the remote control module to a newest image frame captured on the moving platform, then find out a relative position on the newest image frame captured by the moving platform for the tracked object region.

Another exemplary embodiment relates to a tracking method for image object region. The method comprises: storing at least an image frame previously captured on a moving platform into a frame buffer by using a real-time image backward search technique; starting to track an object region from a position pointed out by a remote control module to a newest image frame captured on the moving platform; and finding out a relative position on the newest image frame captured by the moving platform for the tracked object region.

Yet another exemplary embodiment relates to a computer program product for tracking image object region. The computer program product comprises a memory and an executable computer program stored in the memory. The computer program is executed by a processor for performing the following: storing at least an image frame previously captured on a moving platform into a frame buffer by using a real-time image backward search technique; starting to track an object region from a position pointed out by a remote control module to a newest image frame captured on the moving platform; and finding out a relative position on the newest image frame captured by the moving platform for the tracked object region.

The foregoing and other features, aspects and advantages of the present invention will become better understood from a careful reading of a detailed description provided herein below with appropriate reference to the accompanying drawings.

DETAILED DESCRIPTION OF THE EXEMPLARY EMBODIMENTS

The disclosed exemplary embodiments provide a tracking technique for image object region. The exemplary embodiments combine the frame buffer and frame buffer control, and use a real-time image backward search technique to store at least an image frame previously captured on a moving platform into a frame buffer. Through the buffer, the object region tracking algorithm may start tracking an object region from the selected position to avoid the asynchronous image problem between the mobile end and the ground control station due to the network transmission delay. Accordingly, the object region tracking algorithm of the exemplary embodiments does not need to use offset to find the current position of the object region in the image currently captured by the mobile end, so as to reduce the deployment cost of the overall tracking system. The selected object region may include, for example, a moving object, fixed background, or both. The moving object may include, for example, moving vehicles, boats, and the fixed background can include, for example, landscape and buildings.

Figure 1:
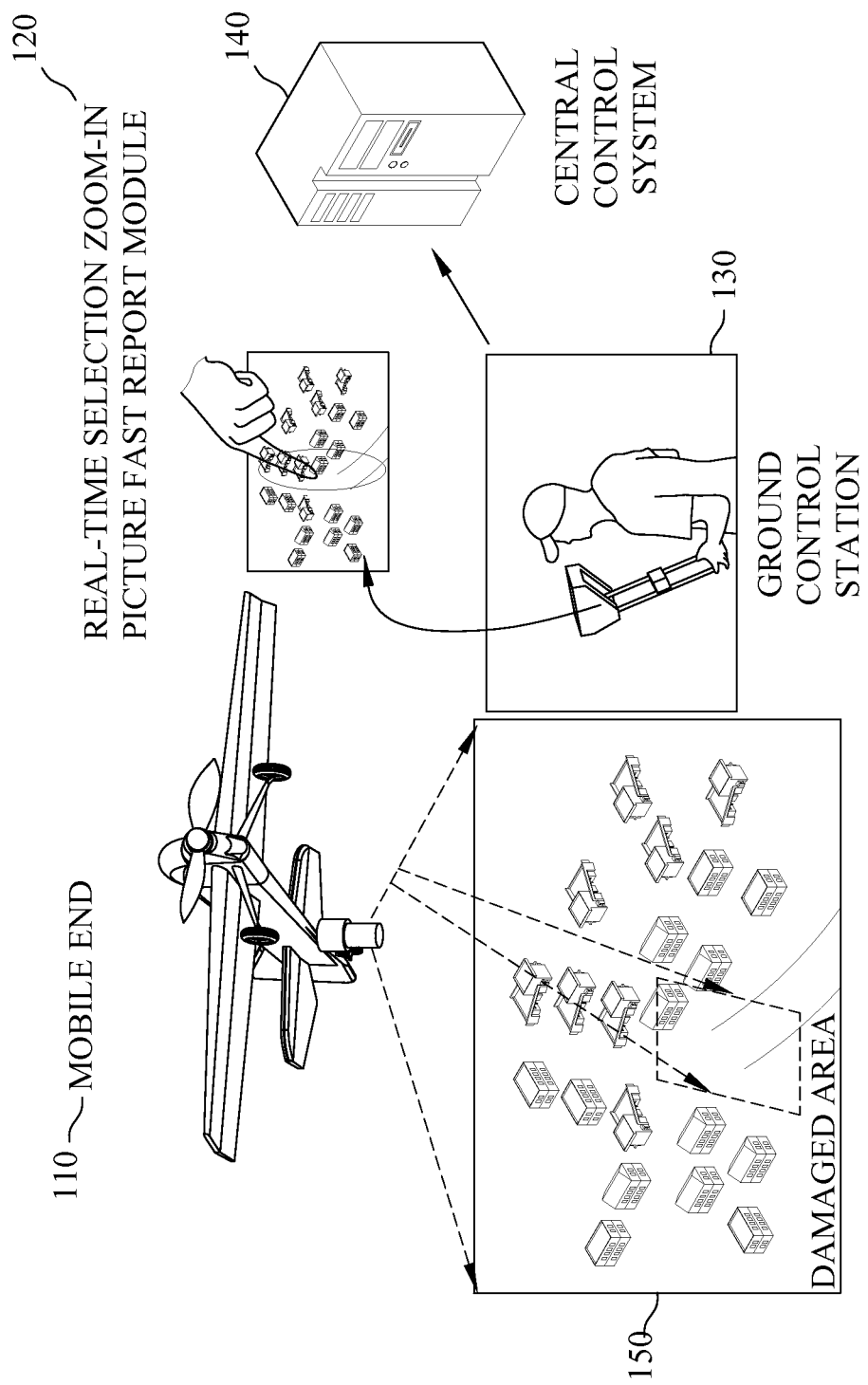
FIG. 1 shows an exemplary schematic view of an application scenario of a mobile large-area rescue information real-time collection system.
Figure 2:
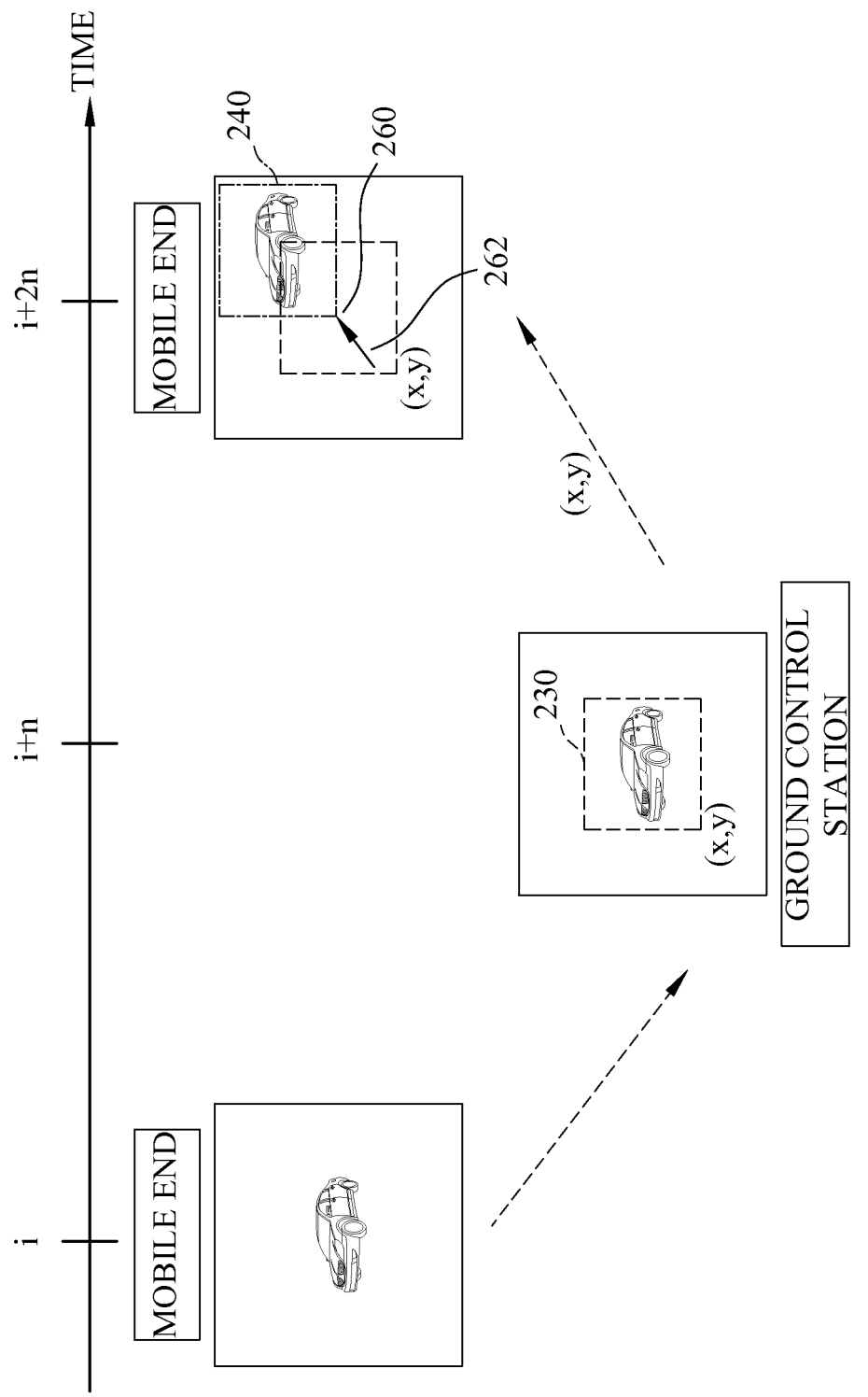
FIG. 2 shows an exemplary schematic view of the image asynchronous problem between the mobile end and the ground control center.
Figure 3:
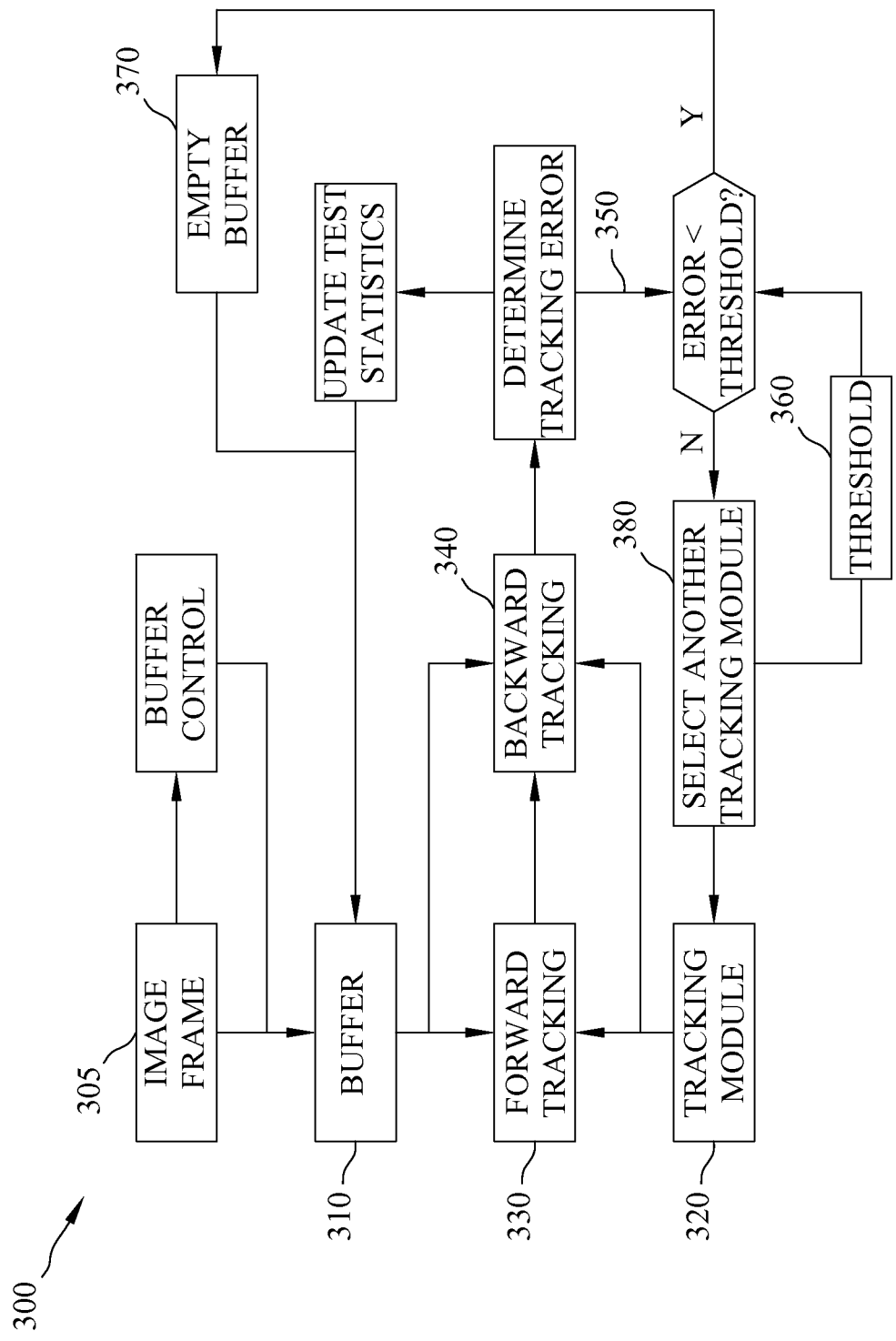
FIG. 3 shows an exemplary schematic view of a real-time object tracking system.
Figure 4:
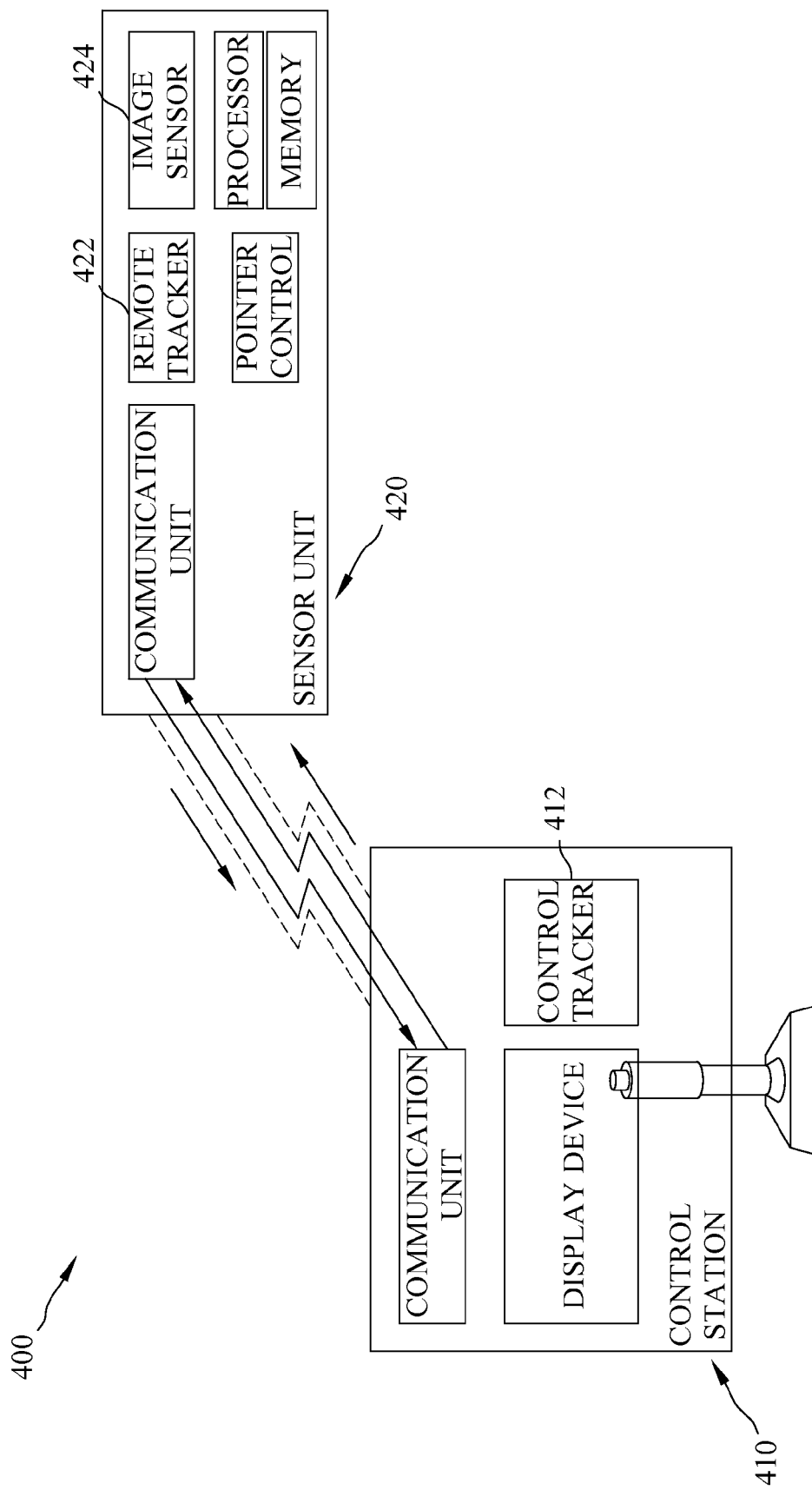
FIG. 4 shows an exemplary schematic view of an object tracking system.
Figure 5:
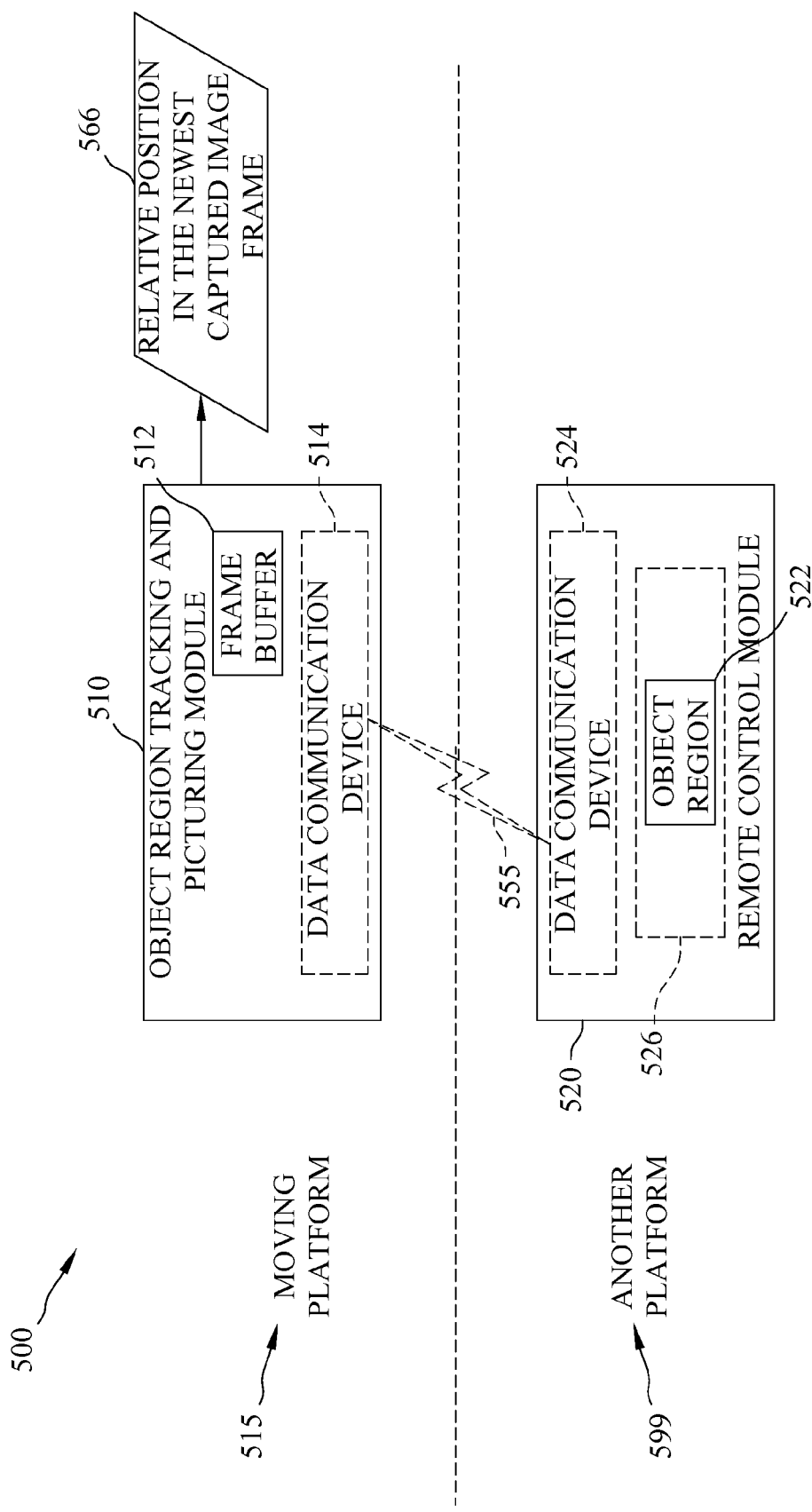
FIG. 5 shows an exemplary schematic view of a tracking system for image object region, consistent with certain disclosed embodiments.

The real-time image backward search technique in the exemplary embodiments is used in the real-time selection zoom-in picture fast report module on the mobile end. FIG. 5 shows an exemplary schematic view of the tracking system for image object region, consistent with certain disclosed embodiments. As shown in FIG. 5, image object region tracking system 500 may comprise an object region tracking and picturing module 510 and a remote control module 520.

Object region tracking and picturing module 510 is constructed on a moving platform 515 of a mobile end, such as, an UAV. Remote control module 520 is constructed on another platform 599, such as a ground control station. Object region tracking and picturing module 510 and remote control module 520 communicate with each other via a digital network 555 for delivering required information. For example, object region tracking and picturing module 510 may include a data communication device 514, and remote control module 520 may include a data communication device 524. Data communication device 512 and data communication device 524 communicate via digital network 555 to transmit the information required by object region tracking and picturing module 510 and remote control module 520. Another platform 599 may also be on the mobile end.

Object region tracking and picturing module 510 uses a real-time image backward search technique to store at least an image frame previously captured on moving platform 515 into frame buffer 512, and start tracking an object region from the position pointed out by remote control module 520, such as an object region 522 selected on a display device 526, to find out a relative position of object region 522 on the newest image frame captured by mobile platform 515. In this manner, without calculating the offset, object region tracking and picturing module 510 may find a relative position 566 of object region 522 on the newest image frame captured by mobile platform 515. Therefore, the overall deployment cost of image object region tracking system 500 may be reduced.

The real-time image backward search technique used by object region tracking and picturing module 510 mainly includes a frame buffer 512 and a frame buffer controller. Frame buffer 512 is for temporarily storing the current image and at least a past image captured by moving platform 515 for tracking an object region. Frame buffer controller is to determine which image frames should be placed in frame buffer 512, and which image frames should be removed from frame buffer 512. In other words, frame buffer controller is to control the size of frame buffer 512, and which image frames to store. Tracking system 500 for image object region of the exemplary embodiments may further include the frame buffer and the frame buffer controller to determine which images frames to store in frame buffer 512. Frame buffer controller may determine the replacement of the image frames to reduce the memory requirements of frame buffer 512.

Figure 6:
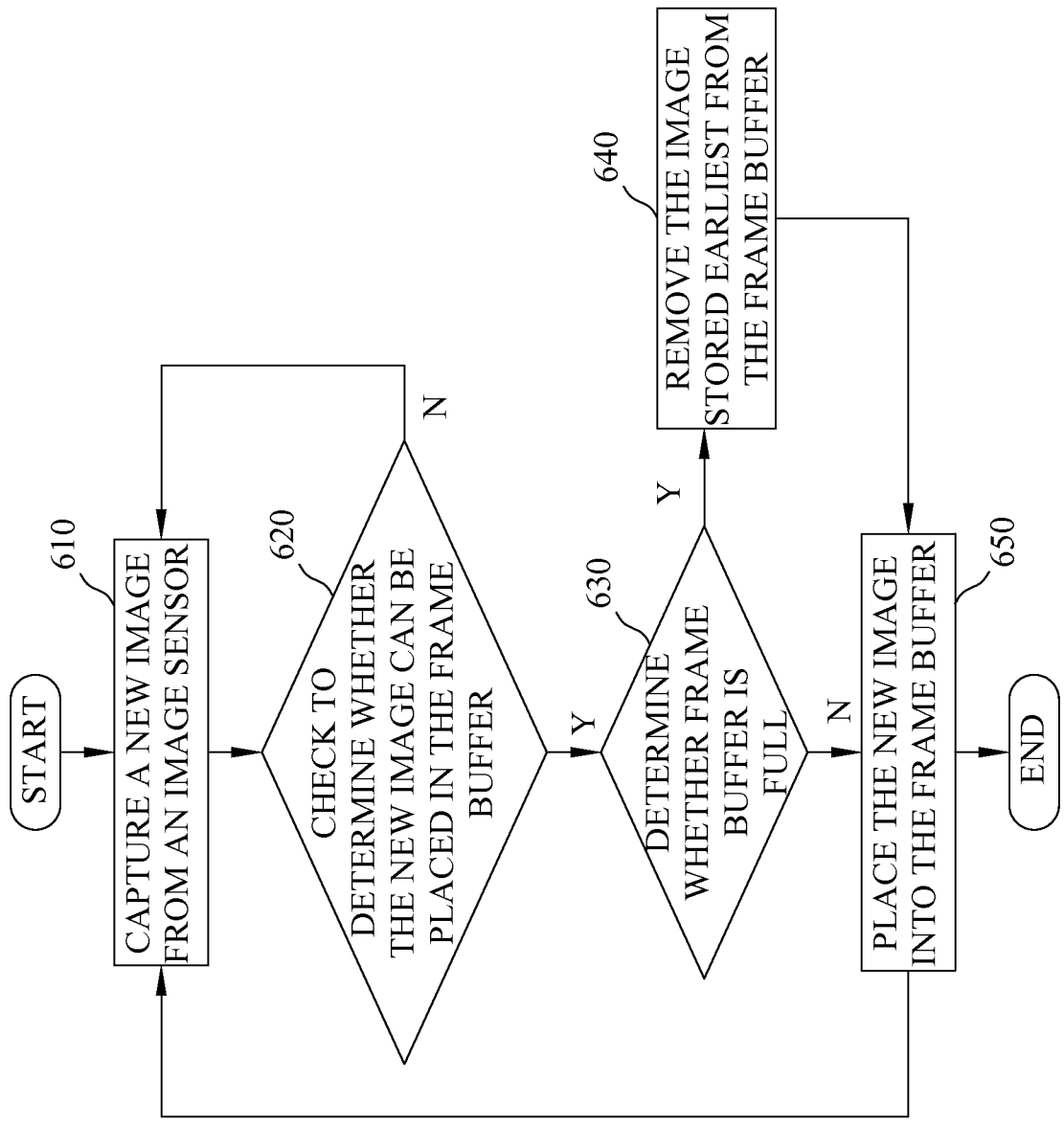
FIG. 6 shows a flowchart illustrating how a frame buffer controller determines the operation of the frame buffer, consistent with certain disclosed embodiments.

FIG. 6 shows a flowchart illustrating how a frame buffer controller determines the operation of the frame buffer, consistent with certain disclosed embodiments. As shown in FIG. 6, first, the frame buffer controller captures a new image from an image sensor (step 610). Then, it checks to determine whether the new image may be placed in the frame buffer 512 (step 620). When the new image cannot be placed in frame buffer 512, the process returns to step 610; otherwise, it further determines whether the frame buffer 512 is full (step 630). When frame buffer 512 is full, the frame buffer controller removes the image stored earliest from frame buffer 512 (step 640); otherwise, it places the new image into frame buffer 512 (step 650). In other words, when the number of stored images is larger than the frame buffer capacity, the frame buffer controller will remove the images stored earliest from the frame buffer to make room for new images. Therefore, frame buffer 512 is a first-in-first-out (FIFO) queue.

Figure 7:
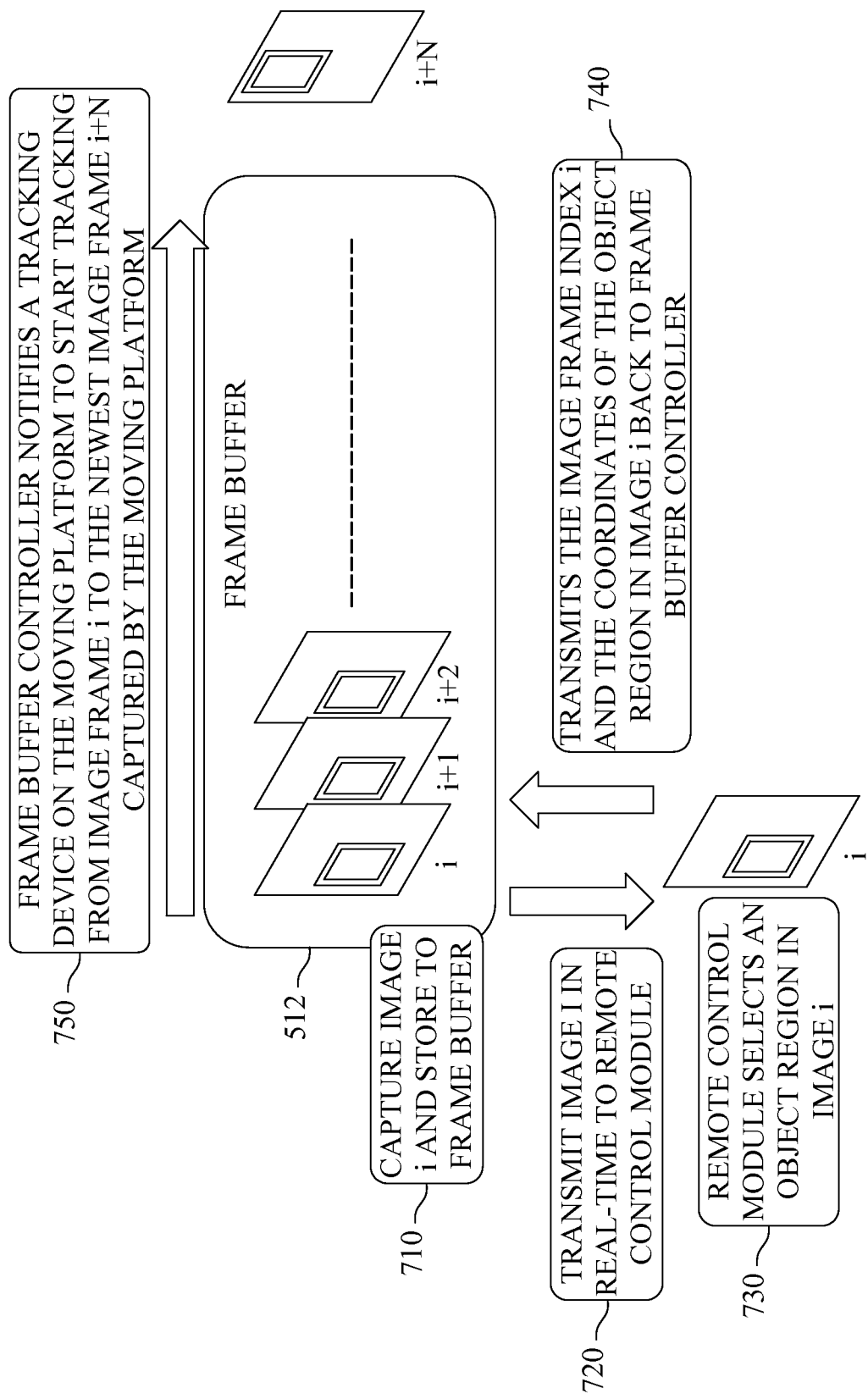
FIG. 7 shows a flowchart illustrating the operation of a real-time image backward search technique, consistent with certain disclosed embodiments.

FIG. 7 shows a flowchart illustrating the operation of the real-time image backward search technique, consistent with certain disclosed embodiments. As shown in FIG. 7, first, image frame i is captured and stored to frame buffer 512 (step 710), and image frame i is transmitted in real-time to remote control module 520 (step 720), such as, through a video streaming module. After remote control module 520 selects an object region in image frame i (step 730), remote control module 520 transmits the frame index i and the coordinates of the object region in image frame i back to frame buffer controller (step 740). At this point, the frame buffer controller notifies a tracking device on the moving platform to start tracking from image i to the newest image captured by the moving platform, i.e., image i+N, as shown in step 750. Because of using frame buffer, the tracking device does not need to calculate the offset to find the relative position of the object region selected by remote control module 520 in the newest image i+N captured by the moving platform.

Figure 8:
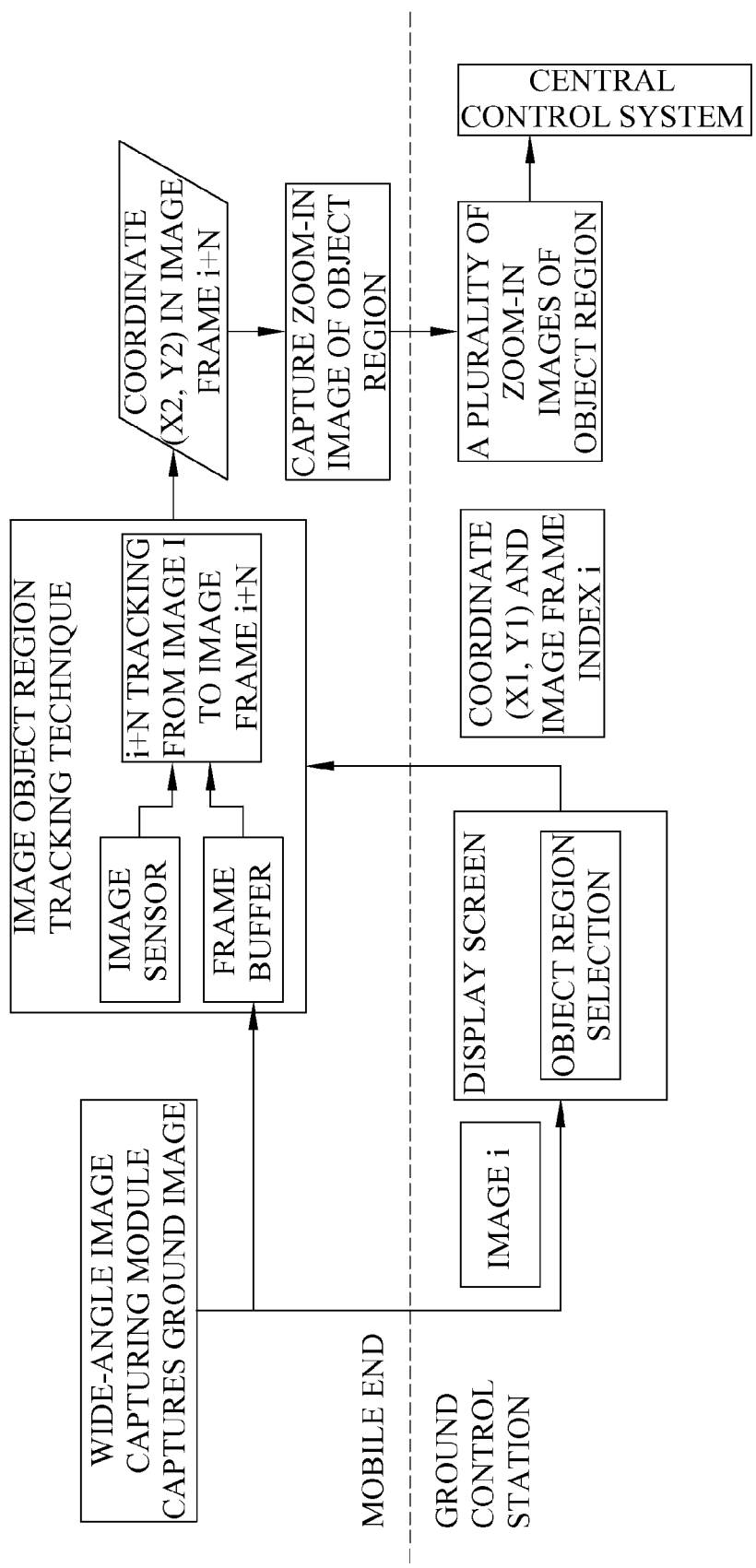
FIG. 8 shows an exemplary schematic view of an application scenario of the tracking technique for an image object region, consistent with certain disclosed embodiments.

FIG. 8 shows an exemplary schematic view of a scenario of the application of tracking technology for image object region to the mobile large-area rescue information real-time collection system, consistent with certain disclosed embodiments. In FIG. 8, when the mobile end starts to operate, the wide-angle image capturing module on the mobile end captures the ground image (i.e. large area image), and transmits the image through a wireless network to the ground control station. The ground control station decodes the compressed image, and displays the decoded image on a display device. At this point, the operator of ground control station, based on the returned video stream, selects the object region, and the ground control station then transmits the coordinates (x1,y1) of the object region in the video stream image and the frame index i to the mobile end.

After a tracking device of object region tracking and picturing module 510 on the mobile end receives the coordinates (x1,y1) of the object region in the video stream image and the image frame index i, the tracking device starts tracking the object region from image i to the newest image i+N captured by the moving platform, and finds the relative position (x2, y2) of the object region in the newest image i+N captured by the moving platform, as well as drives the image capturing module to continue capturing zoom-in images of the object region, and transmits the captured zoom-in images to the ground control center. The ground control station transmits the collected image information through the network in real-time to the central control system. In this manner, the backend rescue command team can accurately know the latest development of the damaged area.

In addition to the application scenario in FIG. 8, the image object region tracking technique may also be applied to remote object region tracking, moving object region lock-in and tracking, and dual dynamic object regions lock-in and tracking.

Figure 9:
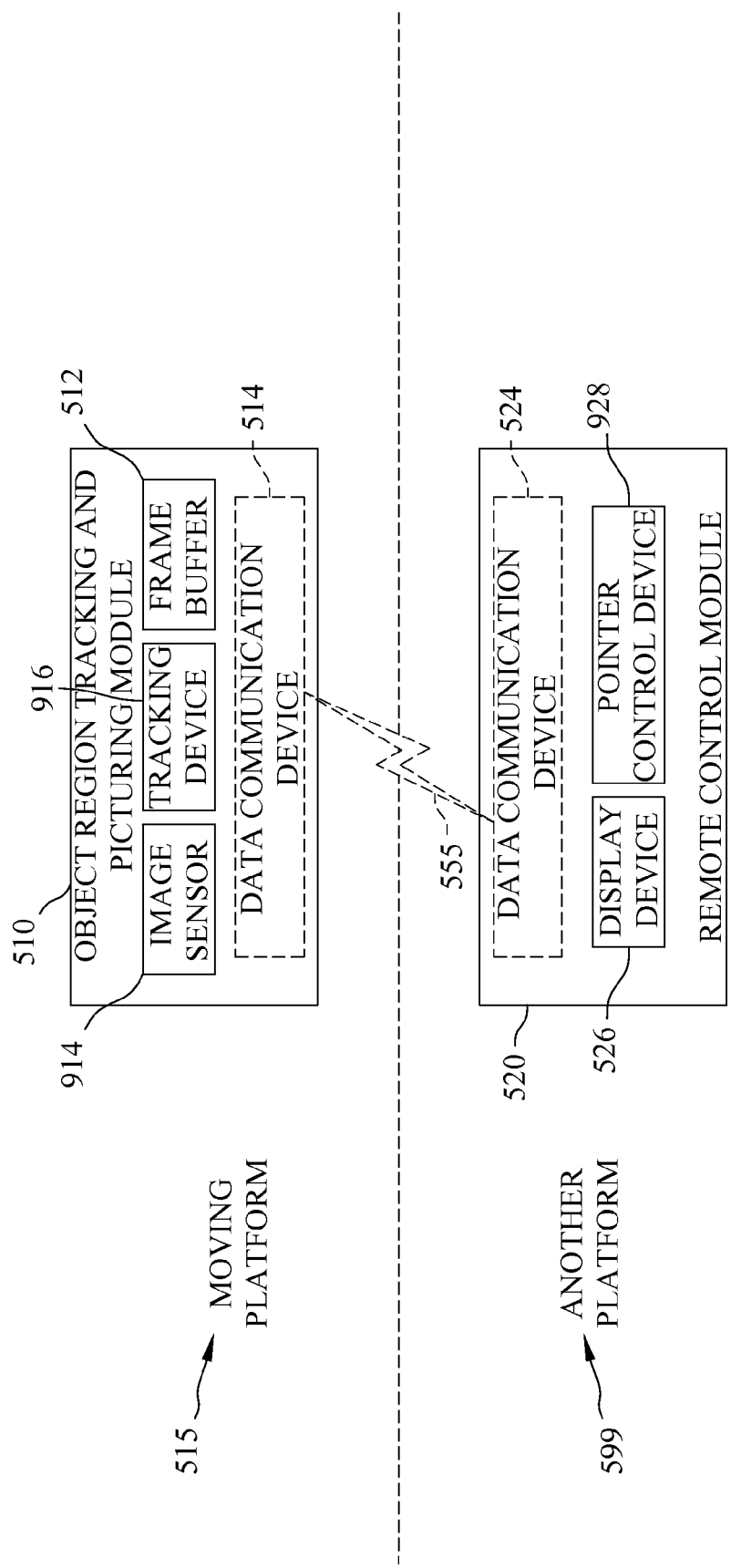
FIG. 9 shows an exemplary schematic view of the internal structures of object region tracking and a picturing module and remote control module, consistent with certain disclosed embodiments.

FIG. 9 shows an exemplary schematic view illustrating the internal structure of object region tracking and picturing module 510 and remote control module 520, consistent with certain disclosed embodiments. As shown in FIG. 9, object region tracking and picturing module 510 may include a frame buffer 512, an image sensor 914, a tracking device 916, and a data communication device 514. Remote control module 520 may include a data communication device 524, display device 526, and a pointer control device 928. The following description illustrates the operation of the image object region tracking system 500 with appropriate reference to the accompanying drawings.

Figure 10:
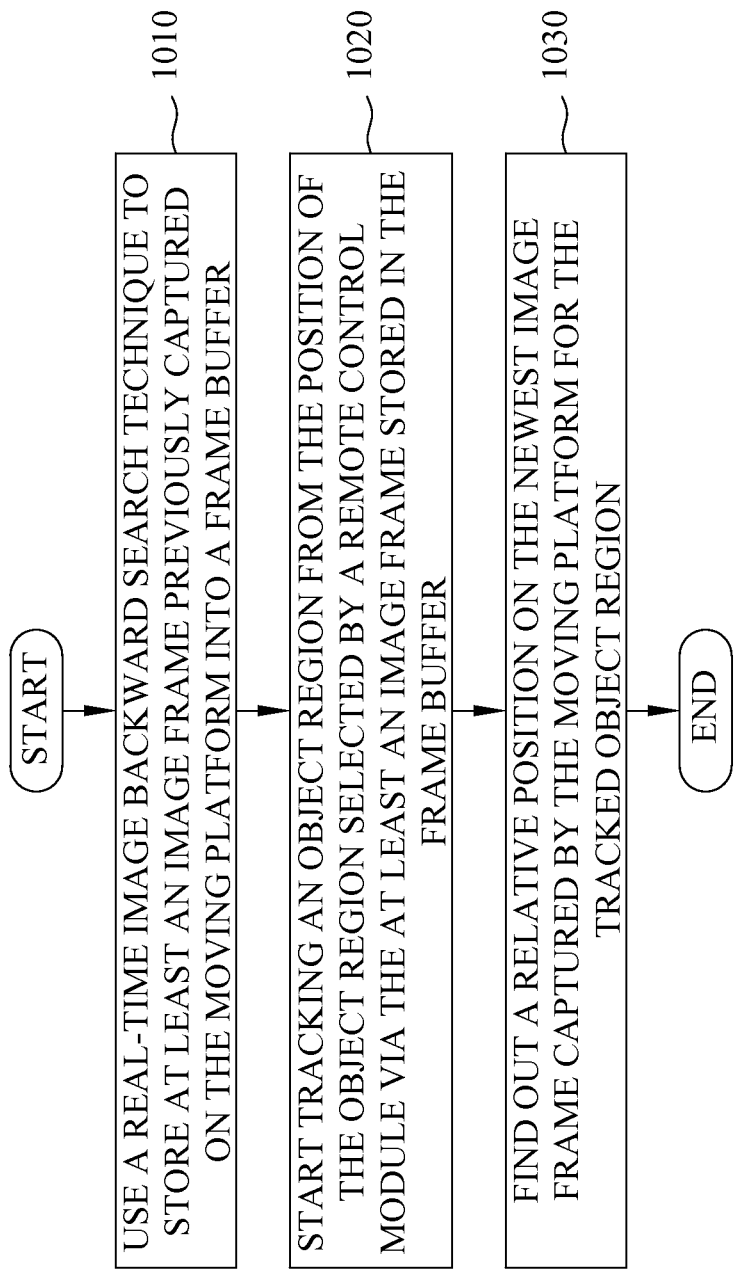
FIG. 10 shows a flowchart illustrating the tracking method for an image object region, consistent with certain disclosed embodiments.

FIG. 10 shows a flowchart illustrating the tracking method for image object region, consistent with certain disclosed embodiments. Referring to FIG. 10, a real-time image backward search technique is used to store at least an image frame previously captured on the moving platform into a frame buffer, as shown in step 1010. In step 1010, the real-time image backward search technique may be executed via object region tracking and picturing module 510, and the at least an image frame may be captured by image sensor 914, and stored into buffer frame 512.

Then, it may start tracking an object region from the position of the object region selected by a remote control module via the at least an image frame stored in frame buffer 512, as shown in step 1020. In step 1020, the selection of the object region may be performed through display device 526 of the remote control module, and the position of the object region in an image may be obtained through pointer control device 928. Through data communication device 524, the image frame index and the position may be transmitted to tracking device 916 of object region tracking and picturing module 510 to start tracking the object region. Then, it may find out a relative position on the newest image frame captured by the moving platform for the tracked object region, as shown in step 1030. Tracking device 916 may transmit the tracking result to drive the image capturing module to continue capturing the zoom-in images of the object region, and use data communication device 514 to transmit the captured zoom-in images back to remote control module 520.

To prevent an effect on the accuracy and speed of the object region tracking algorithm, the image frames stored in the frame buffer are not compressed. Therefore, the frame buffer will need a sizeable memory space to store the previously captured images. For example, a 24-bit uncompressed VGA (640×480) image frame needs a storage space of 0.9216 MB. If the transmission delay is 1 second, the frame buffer must store at least 60 frames of images. In other words, at least 55 MB memory space is required for the frame buffer. In addition, to improve the tracking accuracy and video streaming quality, the image resolution is also increased. Therefore, the memory requirement for frame buffer also increases.

Hence, the disclosed exemplary embodiments provide an effective management mechanism for the frame buffer to reduce the memory requirement. The management mechanism of the frame buffer is to reduce the memory requirement of frame buffer through determining the image frame replaceability. The determination of the image frame replaceability may be used in the aforementioned step 1010, or in the aforementioned frame buffer controller for filtering images to reduce the memory requirements of the frame buffer.

To determine the image frame replaceability, the exemplary embodiments find out which image frames have high repetition, such as, higher than a certain percentage. Then, the image frames with high repetitions are removed from the frame buffer to reduce the memory space requirement of the frame buffer. The replaceability of each image frame is determined by finding whether the size of a residual image of an image frame in another image frame is higher than a certain percentage. The definition of the residual image for the image frame currently in the frame buffer is the similar part of a sub-frame of a reference frame of the specific region. For example, if image A can be replaced by image B, higher than a certain percentage of image data in image A will also appear in image B; that is, the residual image of image A in image B is higher than a certain percentage. For example, when the percentage of a part of the image data present in image A also present in image B exceeds a predefined threshold, the images A and B are considered "similar." If image A can be replaced by image B, only image B is stored to reduce the memory requirement.

The images currently stored in the frame buffer may be current images or images previously captured by image capturing module. Reference images can be a set of images or a single image. For image comparison, a reference image may be a current image or images previously captured by image capturing module. All the image frames stored in the frame buffer may be used as reference images. The sub-frame of the specific region in the current image is defined as the current sub-frame. Using the current sub-frame to find the similar image part in the reference image is to find the reference sub-frame, i.e., residual image.

Figure 11:
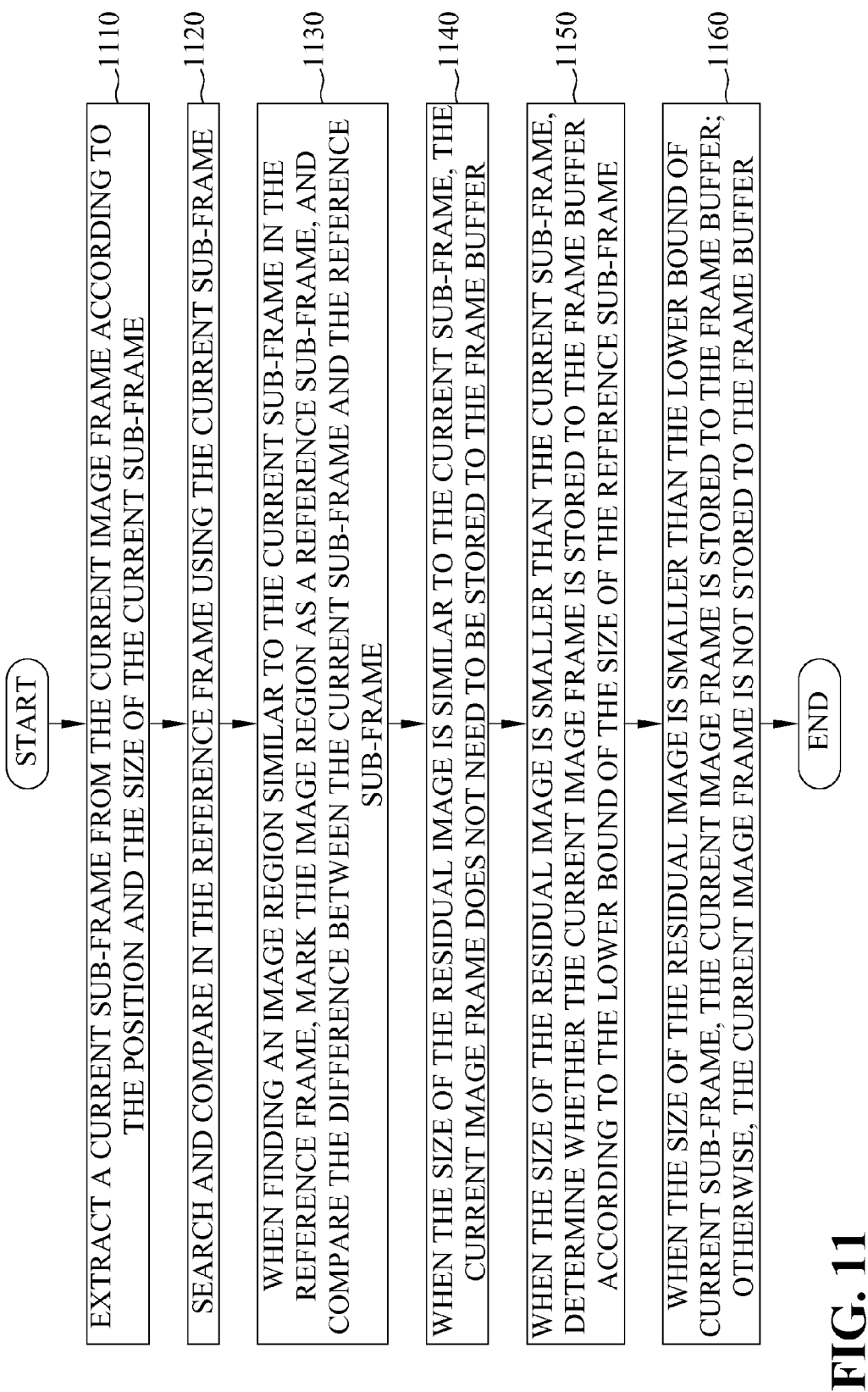
FIG. 11 shows an exemplary schematic view illustrating the determination of replacement for an image frame, consistent with certain disclosed embodiments.

FIG. 11 shows an exemplary schematic view illustrating the determination of image replaceability, consistent with certain disclosed embodiments. First, a current sub-frame is extracted from the current image frame according to the position and the size of the current sub-frame (step 1110). Then, the current sub-frame is used to search and compare in the reference frame (step 1120). In the reference frame, when finding an image region similar to the current sub-frame in the reference frame, the image region is marked as a reference sub-frame, and the difference between the current sub-frame and the reference sub-frame is compared (step 1130). In step 1140, when the size of the residual image is similar to the current sub-frame, the current image frame does not need to be stored to the frame buffer. When the size of the residual image is smaller than the current sub-frame, it is determined whether the current image frame is stored to the frame buffer according to the lower bound of the size of the reference sub-frame (step 1150). When the size of the residual image is smaller than the lower bound of the current sub-frame, the current image frame is stored to the frame buffer; otherwise, the current image frame is not stored to the frame buffer, as shown in step 1160.

When the image object region tracking system operates, the image capturing module continues capturing the images, and storing partial image frames into the frame buffer after the filtering of the frame buffer controller. Therefore, when performing object region tracking, once the speed of storing new images to the frame buffer is faster than the speed of tracking object region, the situation of being unable to track the object region will occur. The disclosed exemplary embodiments provide a mechanism to automatically stop object region tracking. The mechanism is an over-then-stop mechanism. That is, when the object region tracking exceeds a fixed time or the currently processing image is only a few frames away from the currently captured image, the object region tracking stops.

Hence, the disclosed embodiments may use a time counter to count the time spent in object region tracking and a frame difference counter to count the number of frames between the currently processing image and the currently captured image. When object region tracking is activated, the two counters are also set to go. Once the time counter exceeds a threshold, or the frame difference counter is less than a threshold, the object region tracking stops. In other words, the object region tracking system of the exemplary embodiments may further include a time counter and a frame difference counter to perform detection for automatic termination of the object region tracking according to the counted tracking time for the object region and the counted number of frames in difference between the currently processing image and the currently captured image.

Figure 12:
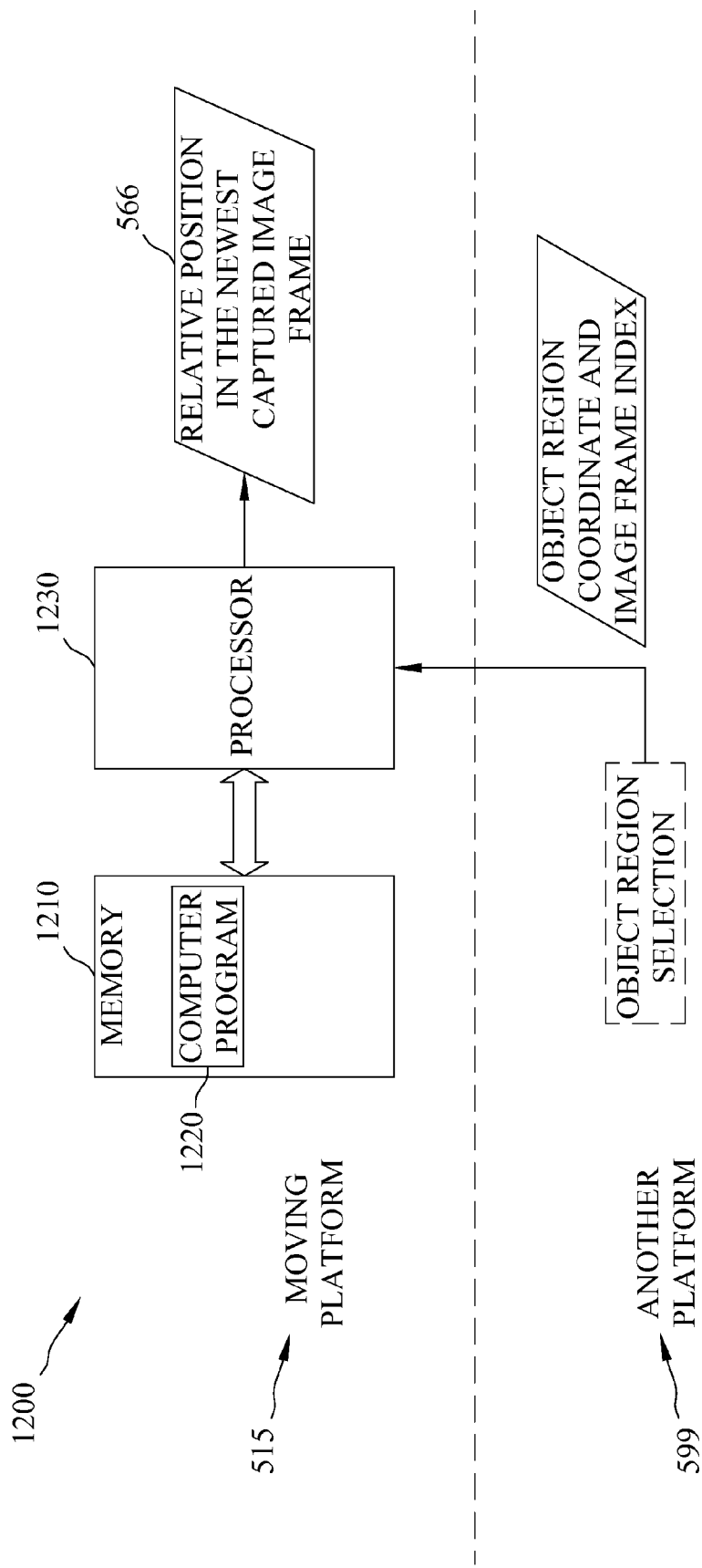
FIG. 12 shows an exemplary schematic view illustrating a computer program product and application scenario for image object region tracking, consistent with certain disclosed embodiments.

The exemplary embodiment may also be realized with a computer program product. As shown in FIG. 12, computer program product 1200 at least includes a memory 1210 and an executable computer program 1220 stored in the memory. The computer program may use a processor 1230 or a computer system to execute the steps 1010-1030 of the object region tracking method of FIG. 10. Processor 1230 may further include object region tracking and picturing module 510 to execute steps 1010-1030. As aforementioned, object region tracking and picturing module 510 and remote control module 520 communicate with each other using a digital network.

Processor 1230 may further include a frame buffer controller to reduce the memory requirement of the frame buffer through the determination of image replaceability. In addition, processor 1230 may further include a time counter and a frame difference counter to automatically stop object region tracking to avoid the situation of unable to finish object region tracking. As shown in FIG. 12, processor or computer system 1230 may also be combined with image capturing module to capture and zoom-in images, such as, the application scenario in FIG. 8, for data transmission and object region tracking.

In summary, the disclosed exemplary embodiments provide an image object region tracking technique, including tracking system and method for image object tracking, and computer program product. In combination with frame buffer and frame buffer controller and by using a real-time image backward search technique, the tracking starts with the position of the selected object region to avoid the asynchronous image frames problem between the mobile platform and another platform caused by the network transmission delay. The disclosed exemplary embodiments do not need to use the offset to find the position of the object region in the current image captured by the mobile end so as to reduce the deployment cost of the tracking system.

Although the present invention has been described with reference to the exemplary embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tracking system for image object region, comprising:
an object region tracking and picturing module constructed on a moving platform of a mobile end, said object region tracking and picturing module is a part of the moving platform; and
a remote control module constructed on another platform, said remote control module communicating with said object region tracking and picturing module via a digital network for transmitting required information;
wherein said object region tracking and picturing module uses a real-time image backward search technique to store at least an image frame previously captured on said moving platform into a frame buffer, and starts to track an object region from a position selected by said remote control module, and finds out a relative position on a newest image frame captured by said moving platform for said tracked object region;
wherein both said object region tracking and picturing module and said remote control module have a data communication device to transmit information required by said object region tracking and picturing module and said remote control module via said digital network; and said system further includes

- a buffer frame controller to reduce a memory requirement of said buffer frame by determining replaceability of image frames based at least partly on a repetition rate of the image frames,
- a time counter and a frame difference counter to perform detection for automatic termination of object region tracking, and
- said frame buffer and an image sensor, and said at least an image is extracted from said image sensor and stored in said frame buffer;

wherein said determining replaceability is further based at least partly on determining a percentage of a first frame that will also appear in a second frame, and if the percentage is determined to be higher than a certain percentage, the first frame is determined to be replaceable by the second frame.

2. The tracking system as claimed in claim 1, wherein said frame buffer is a first-in-first-out queue.

3. The tracking system as claimed in claim 1, wherein said another platform is a ground control station.

4. A tracking method for image object region applicable to an object tracking system, said method comprising:

- storing at least an image frame previously captured on a moving platform into a frame buffer by using a real-time image backward search technique;
- starting to track an object region from a position selected by a remote control module via said at least an image frame stored in said frame buffer;
- finding out a relative position on a newest image frame captured by said moving platform for said tracked object region;
- managing said frame buffer, and determining image frame replaceability to reduce a memory requirement of said frame buffer; and
- performing detection for automatic termination of object region tracking based on time spent on tracking said object region and number of frames in difference between image frame currently processed and image frame currently captured;

wherein said real-time image backward search technique includes:

- capturing an image frame and storing to said frame buffer;
- transmitting said image frame in real-time to said remote control module;
- said remote control module selecting an object region in said image frame;
- said remote control module transmitting an image frame index and coordinates of said object region in said image frame back to a frame buffer controller; and
- said frame buffer controller notifying a tracking device on said moving platform to start tracking from said image frame to said newest image currently captured by said moving platform;

wherein said determining image frame replaceability is to find and remove an image frame with repetition higher than a threshold to reduce a memory requirement of said frame buffer;

wherein when number of images frames stored in said frame buffer is larger than space of said frame buffer, the image frame stored in said frame buffer at the earliest time is removed from said frame buffer; and wherein said determining replaceability is further based at least partly on determining a percentage of a first frame that will also appear in a second frame, and if the percentage is determined to be higher than a certain percentage, the first frame is determined to be replaceable by the second frame.

* * * * *